(12) United States Patent
Nakagawa

(10) Patent No.: US 8,196,562 B2
(45) Date of Patent: Jun. 12, 2012

(54) THROTTLE OPENING CONTROL DEVICE, MOTORCYCLE, AND METHOD FOR PRODUCING CONTROL MAP

(75) Inventor: Yoshitomi Nakagawa, Shizuoka (JP)

(73) Assignee: Yamaha Hatsudoki Kabushiki Kaisha, Shizuoka-ken (JP)

(*) Notice: Subject to any disclaimer, the term of this patent is extended or adjusted under 35 U.S.C. 154(b) by 751 days.

(21) Appl. No.: 12/403,346

(22) Filed: Mar. 12, 2009

(65) Prior Publication Data

US 2009/0229568 A1  Sep. 17, 2009

(30) Foreign Application Priority Data

Mar. 17, 2008  (JP) .................. 2008-067042

(51) Int. Cl.
*F02D 9/00* (2006.01)
*F02P 11/02* (2006.01)
*F02D 41/14* (2006.01)

(52) U.S. Cl. ........................ 123/342; 701/110

(58) Field of Classification Search .......... 123/342, 123/339.1, 339.15, 339.23, 399, 361; 701/110
See application file for complete search history.

(56) References Cited

U.S. PATENT DOCUMENTS 5,586,534 A * 12/1996 Fujimoto .............. 123/339.23
6,055,476 A *  4/2000 Yoshino ................... 701/110
6,786,212 B1   9/2004 Choi
7,052,434 B2   5/2006 Makino et al.
7,823,560 B2 * 11/2010 Nakagawa et al. ........... 123/399

FOREIGN PATENT DOCUMENTS

DE   103 45 999 A1   4/2004
EP    1 574 692 A1   9/2005
JP    2006-207565    8/2006

OTHER PUBLICATIONS

European Search Report, Jun. 18, 2009, for European Patent Application No. EP 09 25 0650 (6 pages).

* cited by examiner

*Primary Examiner* — Hieu T Vo
(74) *Attorney, Agent, or Firm* — Dickstein Shapiro LLP

(57) ABSTRACT

A throttle opening control device for a vehicle having an engine with an electronically controlled throttle valve and an accelerator operated by a rider is provided. The throttle opening control device includes an accelerator opening acquisition module for acquiring an opening of the accelerator, an engine rotation speed acquisition module for acquiring a rotation speed of the engine, and a throttle opening control module for controlling an opening of the throttle valve based on the opening of the accelerator and the rotation speed of the engine. The throttle opening control module is configured to limit the opening of the throttle valve when the rotation speed of the engine is lower than a pre-determined idle rotation speed to prevent reverse rotation of the engine.

23 Claims, 15 Drawing Sheets

THROTTLE OPENING CONTROL DEVICE, MOTORCYCLE, AND METHOD FOR PRODUCING CONTROL MAP

PRIORITY INFORMATION

This patent application is based on and claims priority under 35 U.S.C. §119 to Japanese Patent Application No. 2008-067042, filed on Mar. 17, 2008, the entire contents of which is hereby expressly incorporated by reference.

TECHNICAL FIELD

The present invention relates to a throttle opening control system, engine control unit, motorcycle, and method for producing a control map, and in particular to control means for preventing the reverse rotation of an engine.

BACKGROUND

It has been known that in an engine mounted in a motorcycle or the like, if the gas pressure in a combustion chamber increases when an engine rotation speed decreases to a speed lower than an idle rotation speed, there is a possibility that the engine will be reversely rotated.

Japanese Unexamined Patent Application Publication No. 2006-207565 discloses an engine ignition control device for preventing the reverse rotation of the engine by forcibly making the engine misfire when the revolution speed of the engine becomes lower than a threshold value determined according to a present engine load. However, it would be preferable to prevent the gas pressure itself in the combustion chamber from increasing than to forcibly make the engine misfire, because useless fuel consumption is decreased.

SUMMARY

The present invention has been made in view of the above-mentioned circumstances. One object of the present invention is to provide a method for producing a control map that can prevent the occurrence of a reverse rotation of an engine. Other objects of the present invention include the provision of a throttle opening control device implementing the same as well as a motorcycle equipped with such a throttle opening control device.

To this end, in one aspect, a throttle opening control device includes an accelerator opening acquisition module for acquiring an opening of an accelerator operated by a rider of a vehicle, an engine rotation speed acquisition module for acquiring a rotation speed of an engine mounted in the vehicle, and a throttle opening control module for controlling the opening of a throttle valve of the engine on the basis of the opening of the accelerator and the rotation speed of the engine. The throttle control device is further characterized in that the throttle opening control module limits the opening of the throttle valve when the rotation speed of the engine is lower than a pre-determined idle rotation speed to prevent reverse rotation of the engine.

Moreover, a motorcycle of the present invention is provided with the above-mentioned throttle opening control device.

Further, a method for producing a control map according to another aspect of the present invention relates to an opening of the accelerator operated by a rider of a vehicle and the rotation speed of the engine to an opening of the throttle valve of the engine. The control map is stored in a throttle opening control device for controlling a throttle-valve of an engine. The method is characterized in that the control map is produced on the basis of determining whether reverse rotation of the engine will occur when the opening of the throttle valve is increased in a state where the rotation speed of the engine is lower than a pre-determined idle rotation speed.

According to the present invention, the opening of the throttle is limited when the rotation speed of the engine is lower than the predetermined idle rotation speed. With this setup, an increase in the gas pressure in the combustion chamber of the engine can be prevented. As a result, it is possible to prevent the occurrence of a reverse rotation of the engine.

DETAILED DESCRIPTION

An embodiment of the present invention will be described with reference to the drawings.

Figure 1:
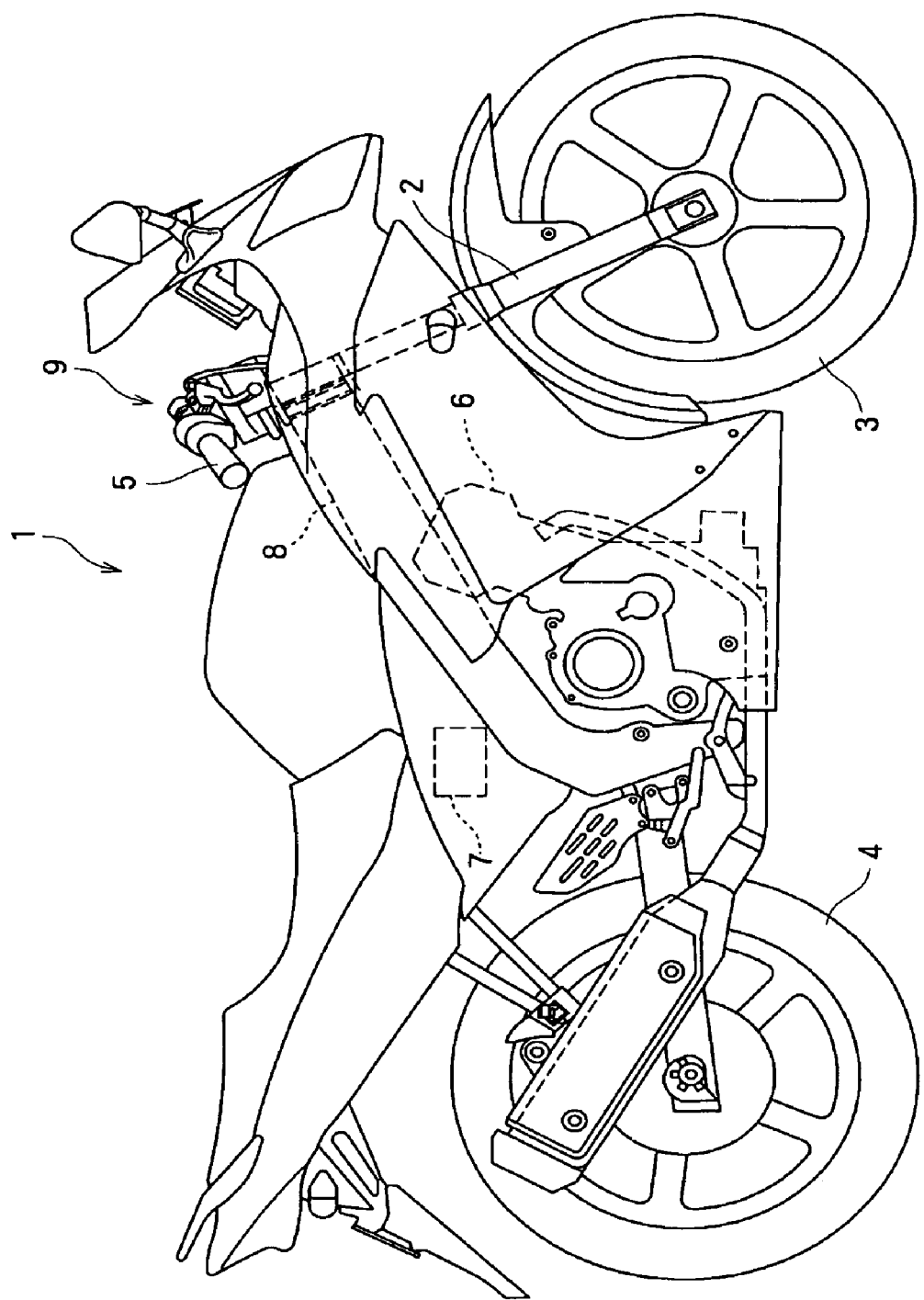
FIG. 1 is a side view of a motorcycle according to an embodiment of the present invention.

FIG. 1 is a side view of a motorcycle 1 according to an embodiment of the present invention. As shown in the drawing, in the motorcycle 1, an engine 6 is suspended by a main frame 8 extending rearward and downward from a head pipe that steerably supports a front fork 2. The power of the engine 6 is transmitted to a rear wheel 4 by a chain. The front fork 2 rotatably supports a front wheel 3 and has a steering handlebar 9 fitted on its top. The steering handlebar 9 has an accelerator grip 5 fitted to its right end portion. A rider varies the direction of the front wheel 3 by the use of the steering handlebar 9 and can adjust the output of the engine 6 by twisting the accelerator grip 5.

Figure 2:
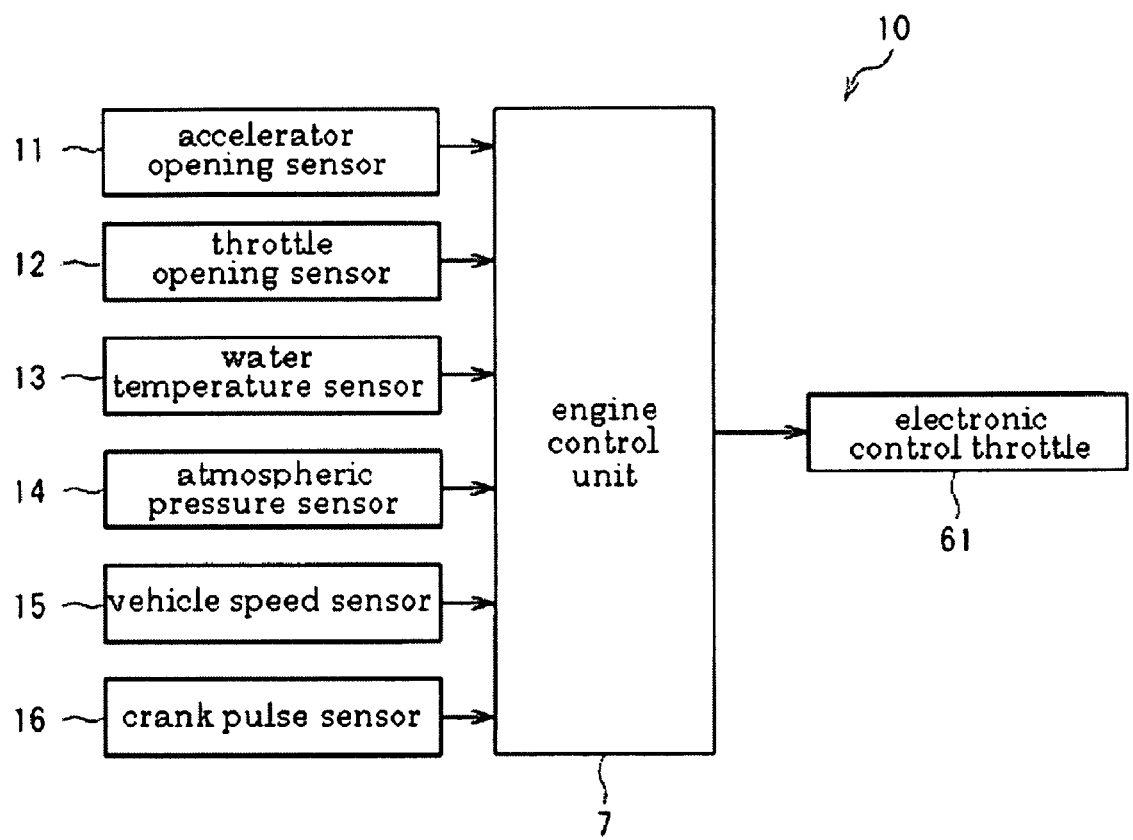
FIG. 2 is a block diagram of an exemplary throttle opening control system.

FIG. 2 is a block diagram of an exemplary throttle opening control system 10 mounted in the motorcycle 1. As shown in the drawing, the throttle opening control system 10 includes an engine control unit (ECU) 7 as a throttle opening control device according to an embodiment of the present invention. ECU 7 comprises one or more microprocessors, and executes a control program, preferably, stored in ROM (Read-Only Memory) to realize a throttle opening control according to this embodiment.

The motorcycle 1 is provided with an accelerator opening sensor 11 for detecting the state of operation (degree of twist) of the accelerator grip 5, that is, the degree of accelerator opening, a throttle opening sensor 12 for detecting the degree of opening (throttle opening) of a throttle valve (electronically controlled throttle 61 to be described later) of the engine 6, a water temperature sensor 13 for detecting the temperature of cooling water of the engine 6, an atmospheric pressure sensor 14 for detecting the atmospheric pressure, a vehicle speed sensor 15 for detecting the running speed of the motorcycle 1, and a crank pulse sensor 16 for detecting a crank pulse outputted in response to the revolution of a crankshaft of the engine 6. Detection results (outputs) from these detection sensors are inputted to the ECU 7, as schematically depicted in reference to FIG. 2.

Moreover, the engine 6 of the motorcycle 1 is provided with electronically controlled throttle 61, and the ECU 7 supplies the electronically controlled throttle 61 with a control signal on the basis of the detection results by the above-mentioned various detection devices. This electronically controlled throttle 61 is a throttle valve that can have its opening freely controlled by a DC motor according to the control signal input from the ECU 7.

Figure 3:
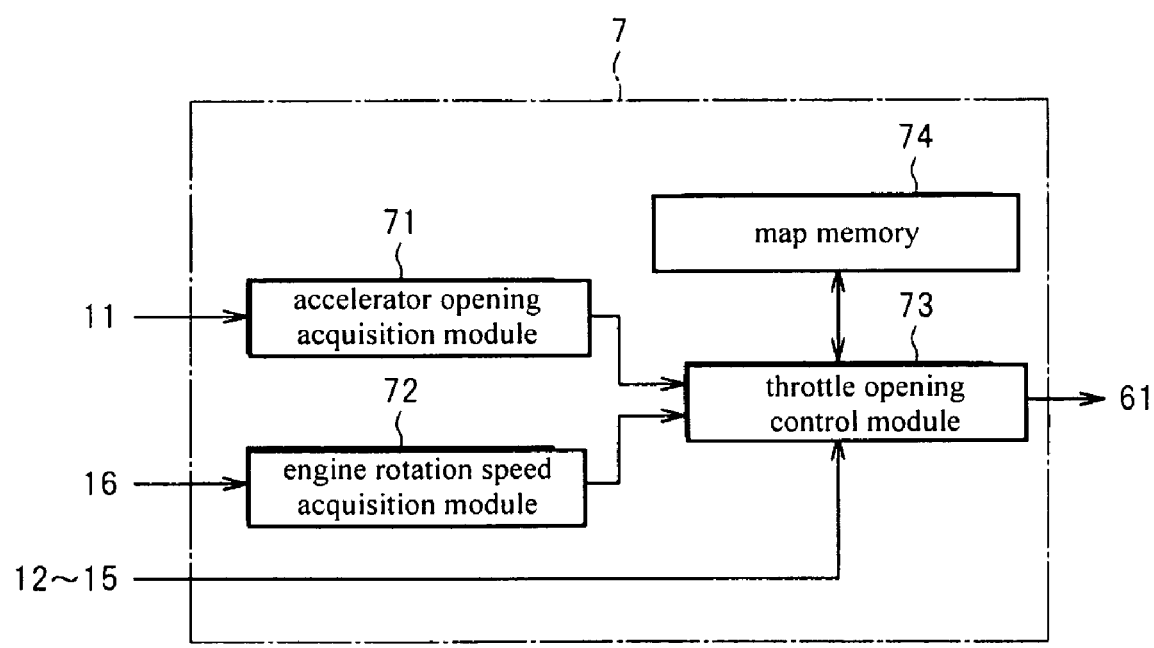
FIG. 3 is a block diagram of a throttle opening control device according to an embodiment of the present invention.

FIG. 3 is a block diagram illustrating the construction of one embodiment of an ECU 7. The ECU 7 functionally has an accelerator opening acquisition module 71, an engine rotation speed acquisition module 72, a throttle opening control module 73, and a map memory 74. The accelerator opening acquisition module 71 acquires an accelerator opening on the basis of the detection signal from the accelerator opening sensor 11 and outputs the accelerator opening to the throttle opening control module 73. The engine rotation speed acquisition module 72 determines the rotation speed (the number of revolutions per unit time) of the engine 6 on the basis of the detection signal from the crank pulse sensor 16 and outputs the rotation speed of the engine 6 to the throttle opening control module 73.

The throttle opening control module 73 determines the throttle opening of the electronically controlled throttle 61 on the basis of the accelerator opening and the rotation speed of the engine, which are inputted thereto, and supplies the electronically controlled throttle 61 with a control signal so as to realize the determined throttle opening. Specifically, the throttle opening control module 73 produces a control signal for reducing the deviation between the throttle opening, determined on the basis of the accelerator opening and the engine rotation speed, and the present throttle opening acquired from the throttle opening sensor 12 and supplies the control signal to the electronically controlled throttle 61.

Here, the throttle opening control module 73 determines a throttle opening, which the electronically controlled throttle 61 needs to realize, on the basis of a control map held (stored) by the map memory 74. This control map is a three dimensional map that relates the throttle opening to the accelerator opening and the engine rotation speed in a desired manner.

The throttle opening control module 73 reads a throttle opening corresponding to the accelerator opening and the engine rotation speed with reference to the control map. The control map will be described in detail hereinbelow.

Moreover, the throttle opening control module 73 preferably corrects the throttle opening read from the control map on the basis of input from the water temperature sensor 13 and the atmospheric pressure sensor 14 and determines a final throttle opening.

Moreover, the map memory 74 holds a plurality of control maps corresponding to the respective states of the transmission of the engine 6, and the throttle opening control module 73 determines a present transmission ratio of the transmission of the engine 6 from the ratio between the engine rotation speed and the vehicle speed of the motorcycle 1, acquired from the vehicle speed sensor 15, and refers to the control map corresponding to the transmission ratio.

Figure 4A:
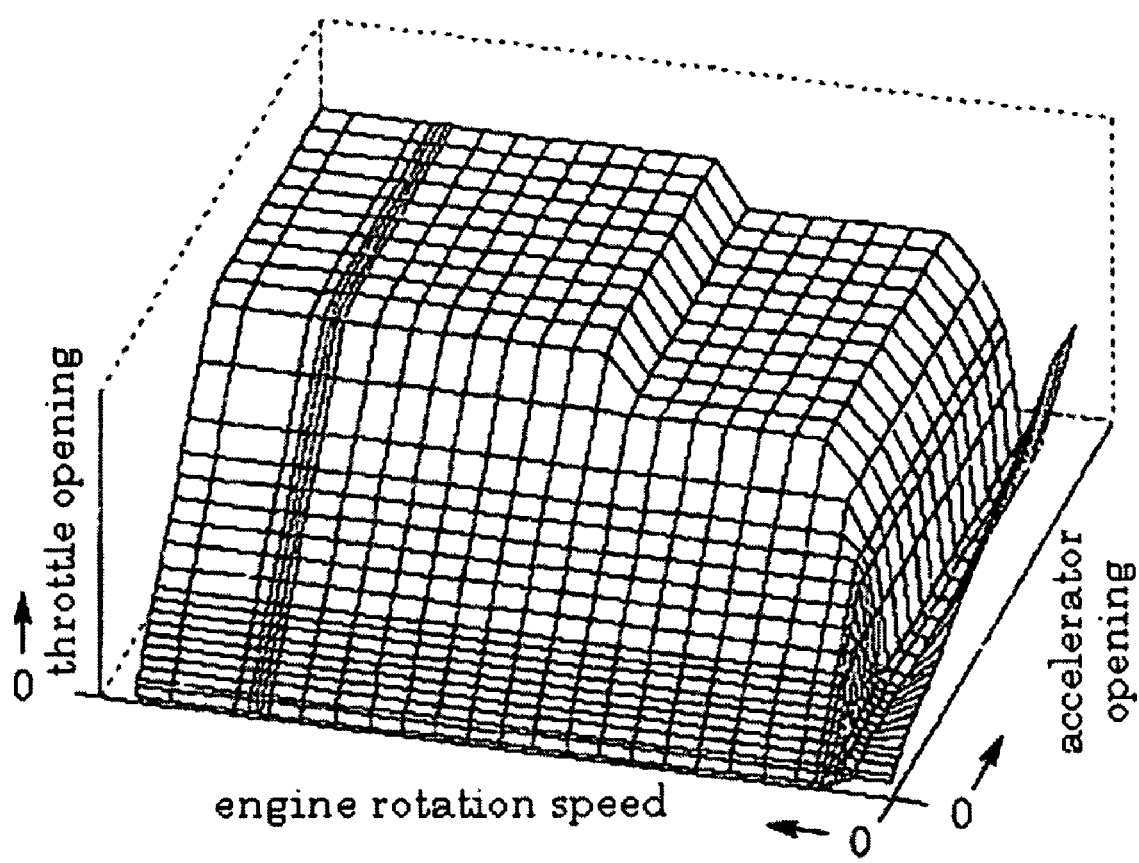
FIG. 4A is a diagram showing an exemplary throttle control map.
Figure 4B:
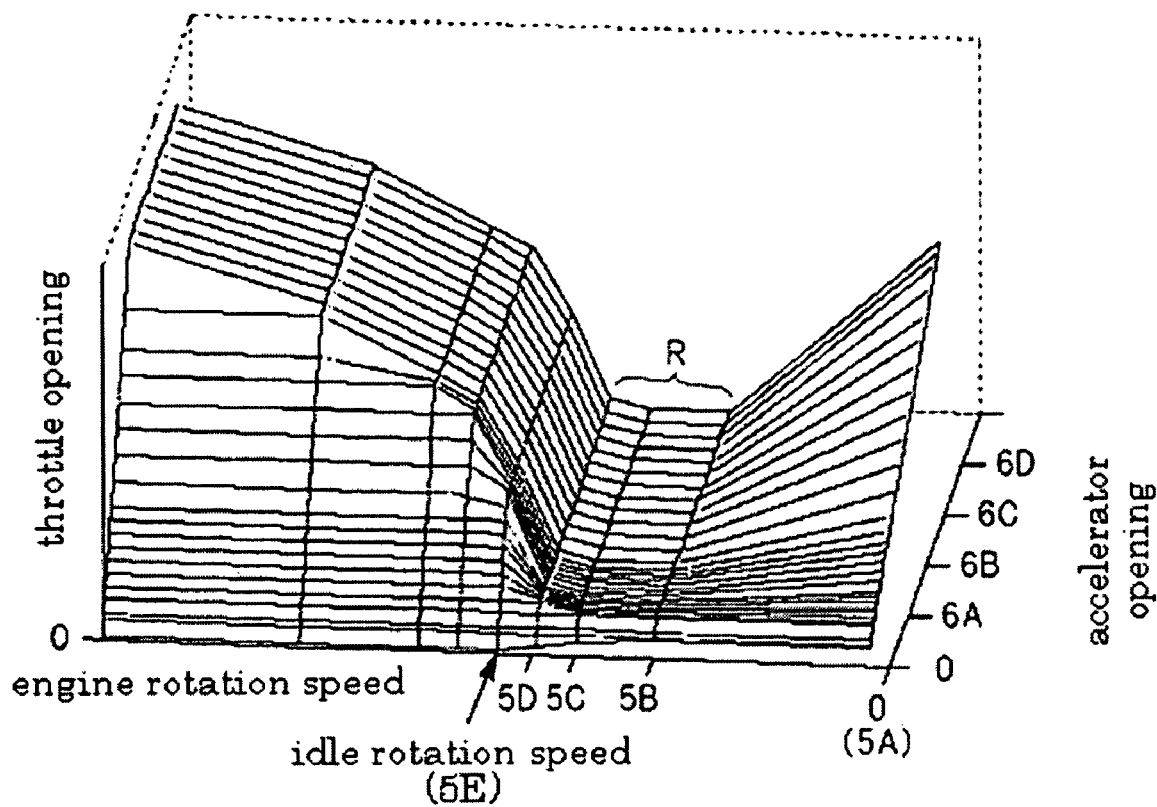
FIG. 4B shows an enlarged portion of the control map of FIG. 4A.

FIG. 4A is a diagram showing one example of a control map that may be used in the engine control unit 7. FIG. 4B shows an enlarged portion of the control map of FIG. 4A. Specifically, FIG. 4B shows a portion of the control map of FIG. 4A corresponding to a range in which the engine rotation speed is relatively small. The control map of FIG. 4A applies to a case in which the transmission of the engine 6 is determined to be in neutral, for example, at the time of engine startup, to a period of time that elapses from the startup of the engine until the clutch is connected.

FIGS. 5A to 5E are graphs showing the relationship in the control map between accelerator opening and throttle opening at specific engine rotation speeds, respectively. Further, FIGS. 6A to 6D are graphs showing the relationship between engine rotation speed and throttle opening at specific accelerator openings in the control map of FIG. 4B, respectively.

As shown in FIG. 4A, the control map is set up in such a way that the throttle opening roughly follows the accelerator opening in a range in which the engine rotation speed is larger than a predetermined idle rotation speed. Specifically, the throttle opening is in a linear relationship with the accelerator opening, whereas, in a range in which the accelerator opening is relatively large, the throttle opening is constant irrespective of the accelerator opening.

On the other hand, as shown in the control map of FIG. 4B, in a range in which the engine rotation speed is lower than the predetermined idle rotation speed, the throttle opening is limited so as to prevent the reverse rotation of the engine. Specifically, the throttle opening is made small in a band-shaped region R located at the higher side of the engine rotation speed in the portion of the control map in which the engine rotation speed ranges from zero to the idle rotation speed and that covers the entire range of the accelerator opening. The throttle opening in this region R is sufficiently small when compared with the throttle opening at the idle rotation speed. By limiting the throttle opening in this manner, an increase in the gas pressure in the combustion chamber of the engine 6 can be prevented. With this throttle opening limitation, the occurrence of a reverse rotation of the engine 6 can be prevented.

Figure 5A:
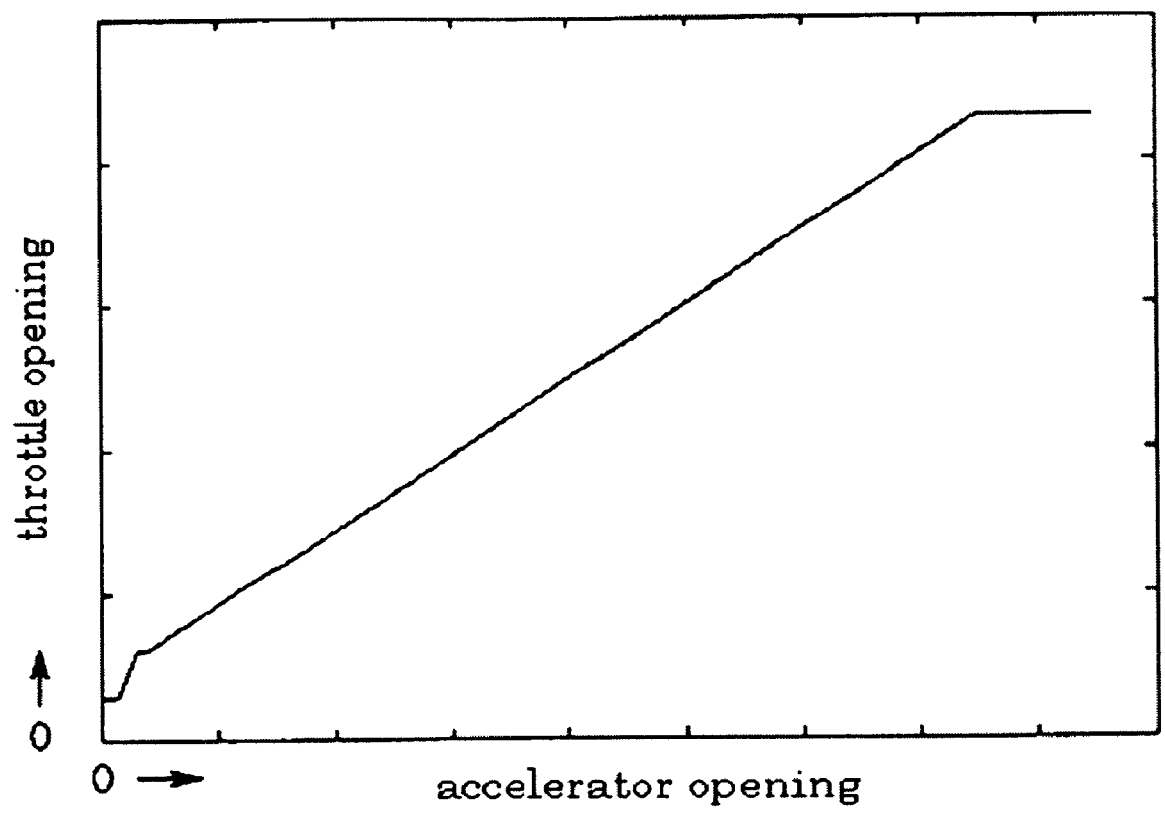
FIG. 5A is a graph showing the relationship between accelerator opening and throttle opening corresponding to a first engine rotation speed of the control map of FIG. 4B.
Figure 5B:
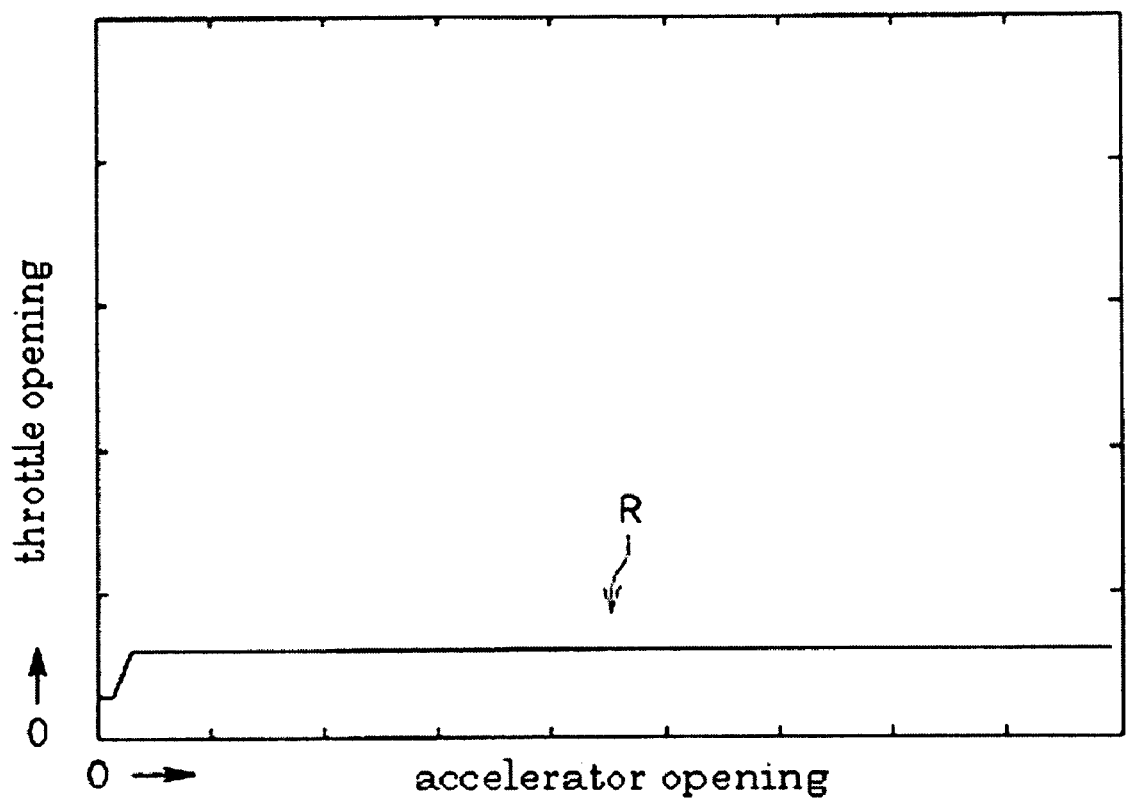
FIG. 5B is a graph showing the relationship between accelerator opening and throttle opening corresponding to a second engine rotation speed of the control map of FIG. 4B.
Figure 5C:
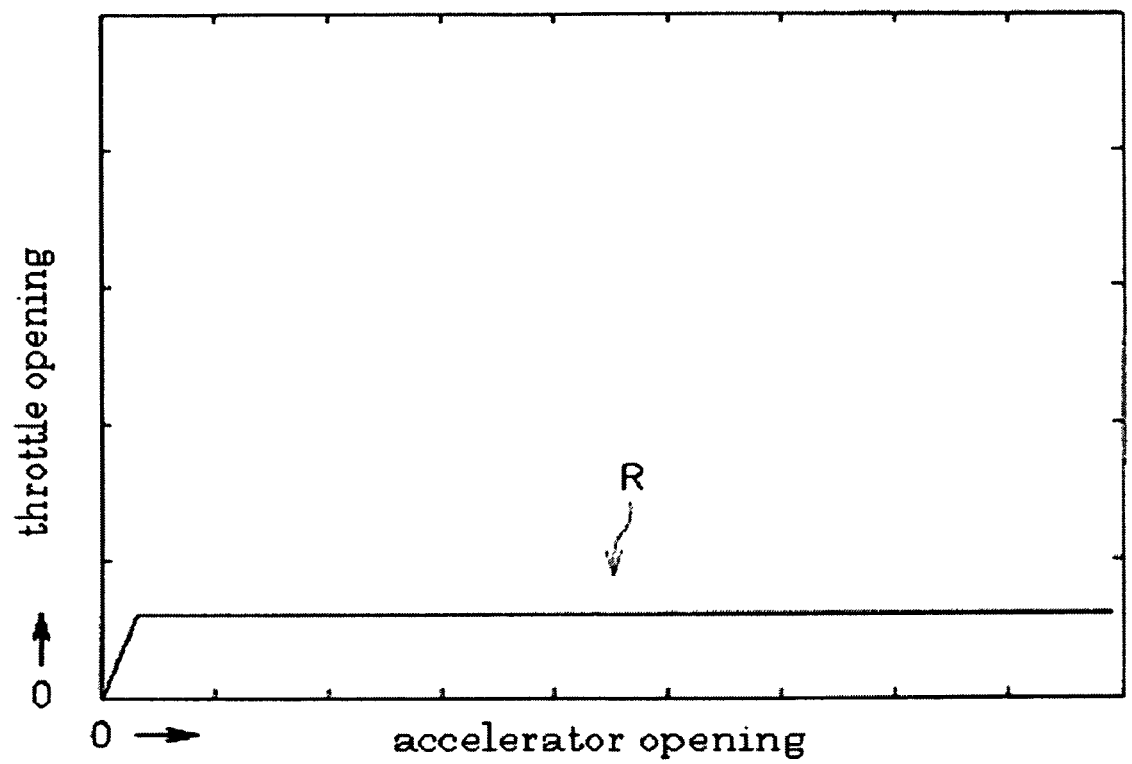
FIG. 5C is a graph showing the relationship between accelerator opening and throttle opening corresponding to a third engine rotation speed of the control map of FIG. 4B.
Figure 5D:
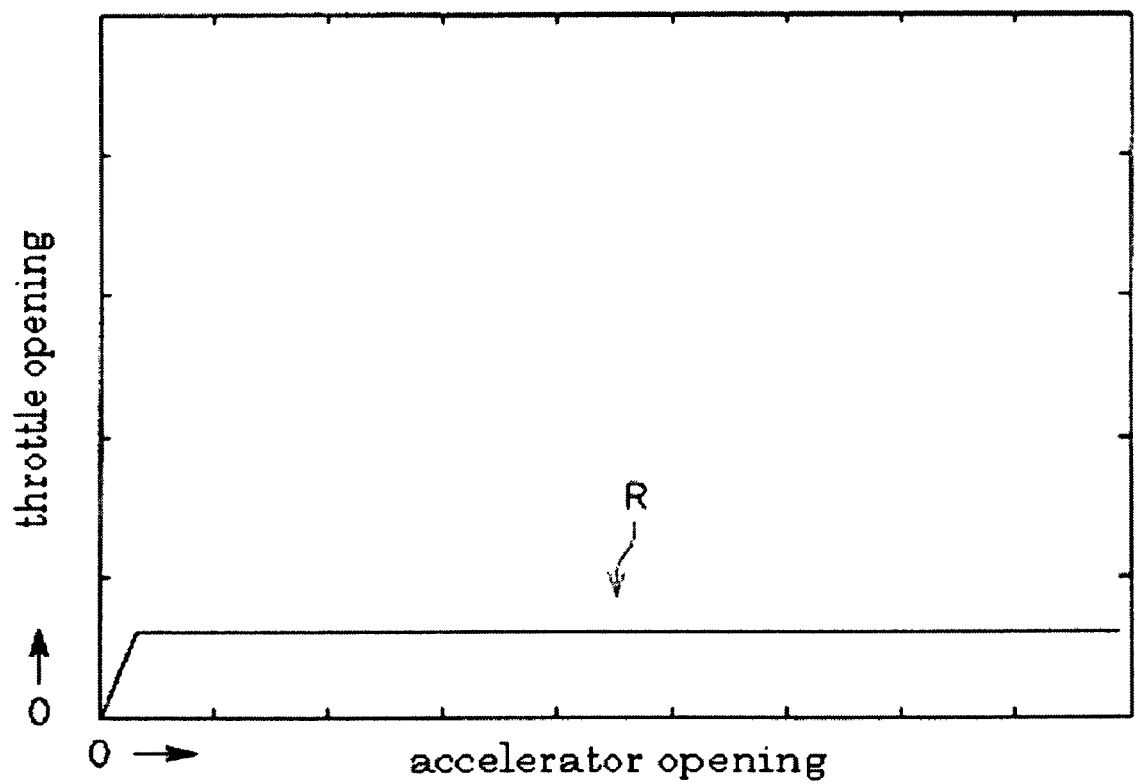
FIG. 5D is a graph showing the relationship between accelerator opening and throttle opening corresponding to a fourth engine rotation speed of the control map of FIG. 4B.
Figure 5E:
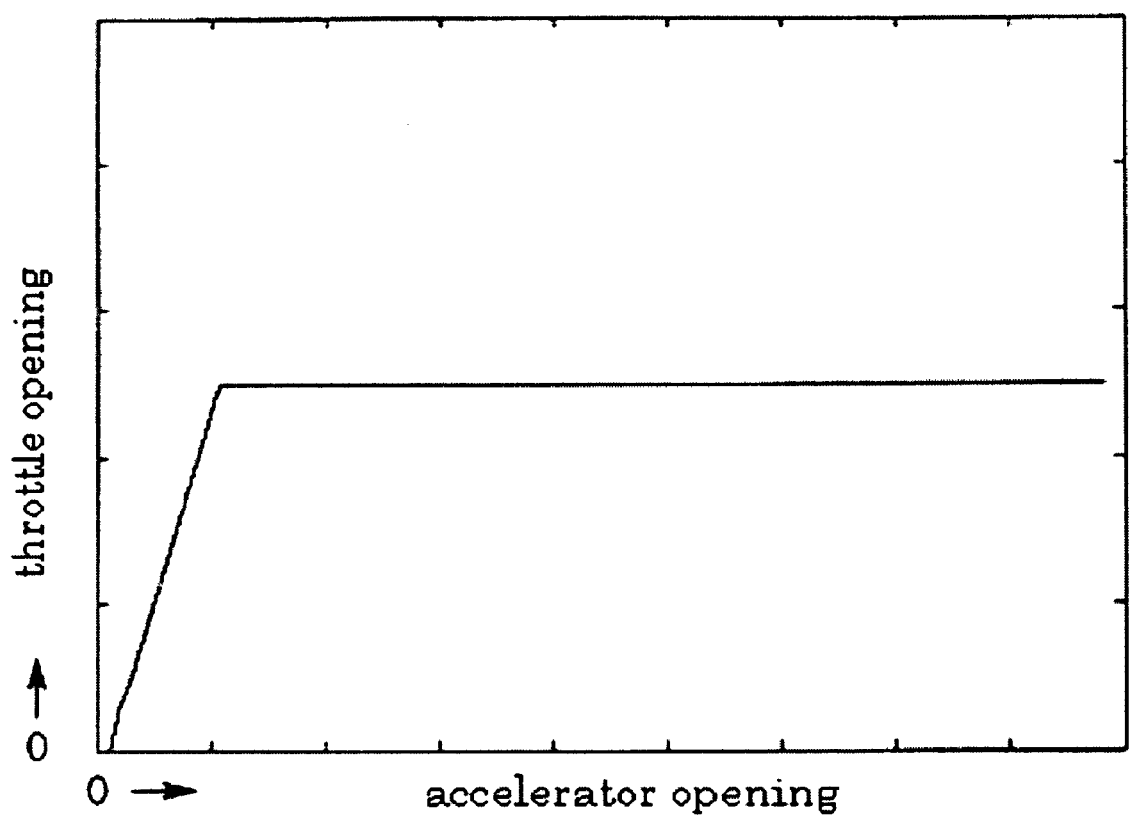
FIG. 5E is a graph showing the relationship between accelerator opening and throttle opening corresponding to a fifth engine rotation speed of the control map of FIG. 4B.
Figure 6A:
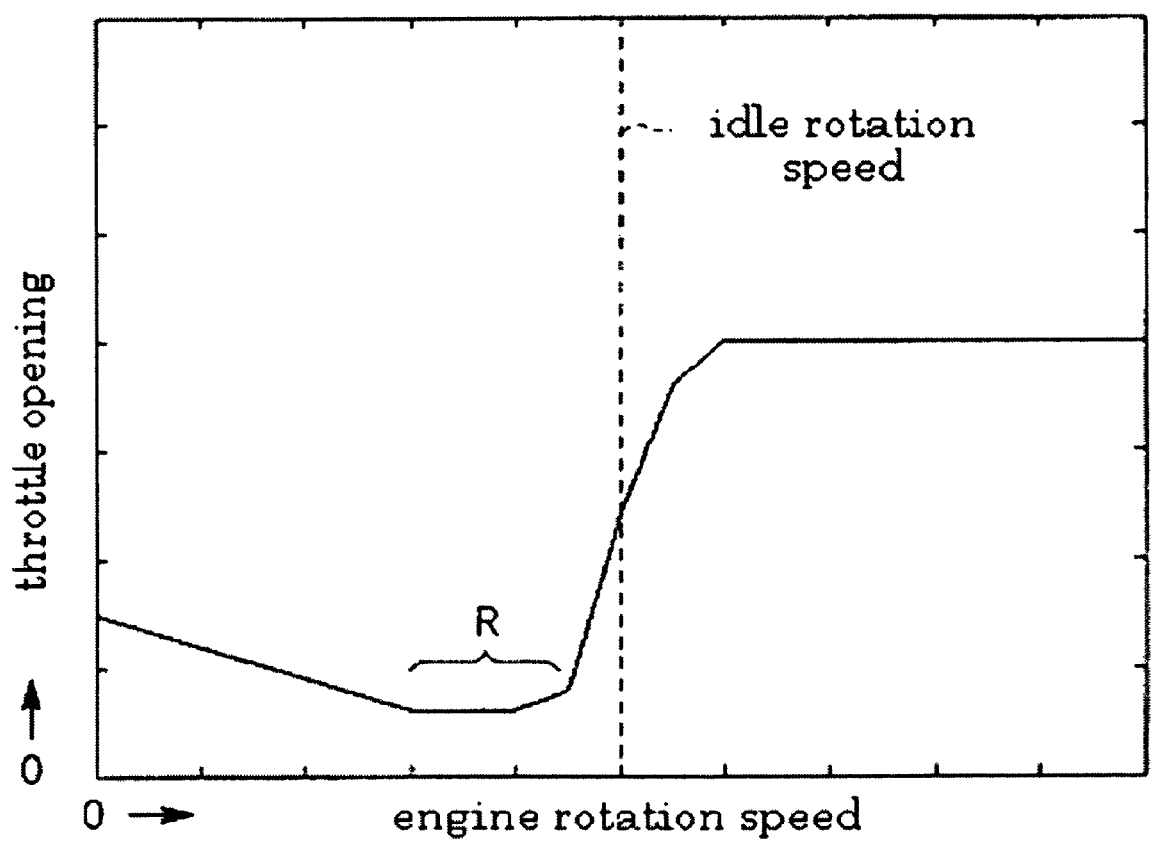
FIG. 6A is a graph showing the relationship between engine rotation speed and throttle opening corresponding to a first accelerator opening of the control map of FIG. 4B.
Figure 6B:
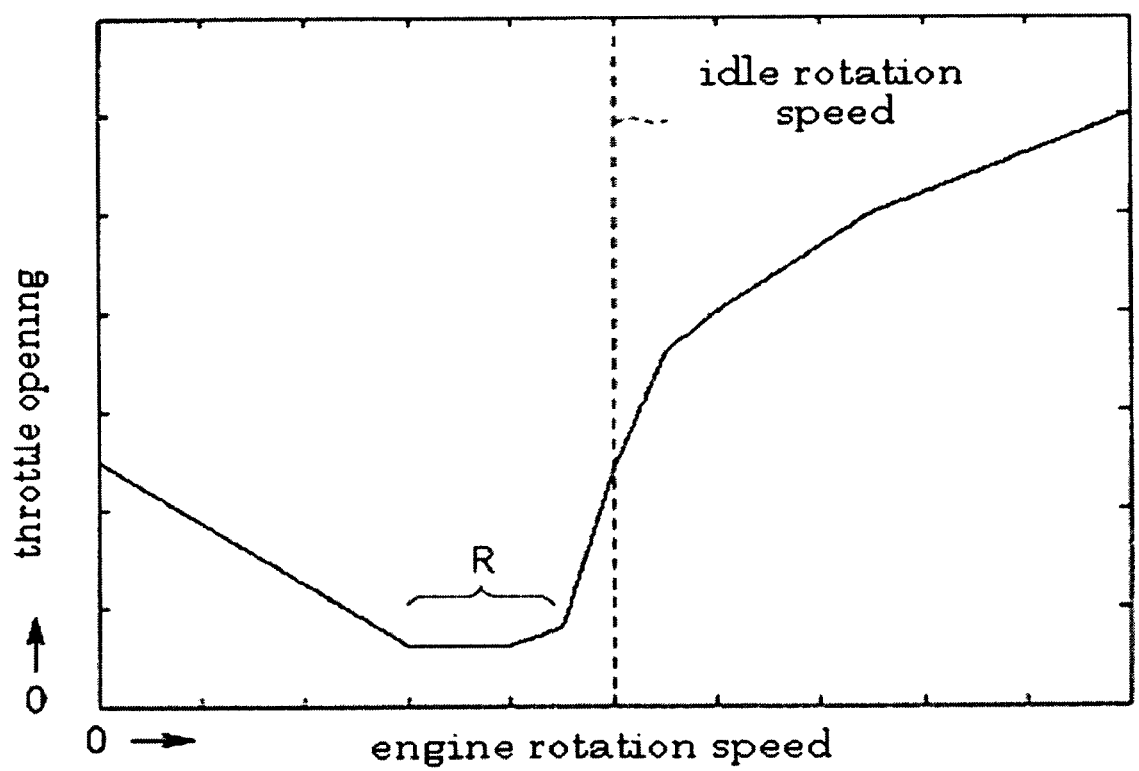
FIG. 6B is a graph showing the relationship between engine rotation speed and throttle opening corresponding to a second accelerator opening of the control map of FIG. 4B.
Figure 6C:
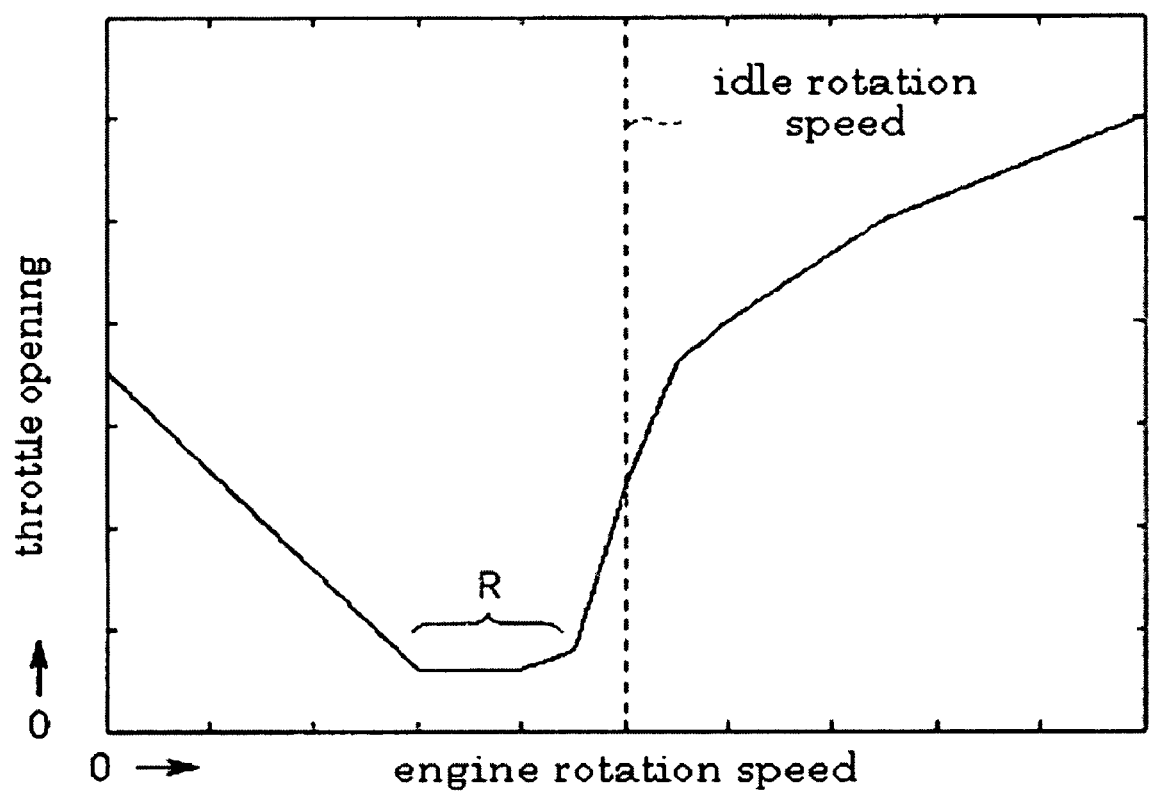
FIG. 6C is a graph showing the relationship between engine rotation speed and throttle opening corresponding to a third accelerator opening of the control map of FIG. 4B.
Figure 6D:
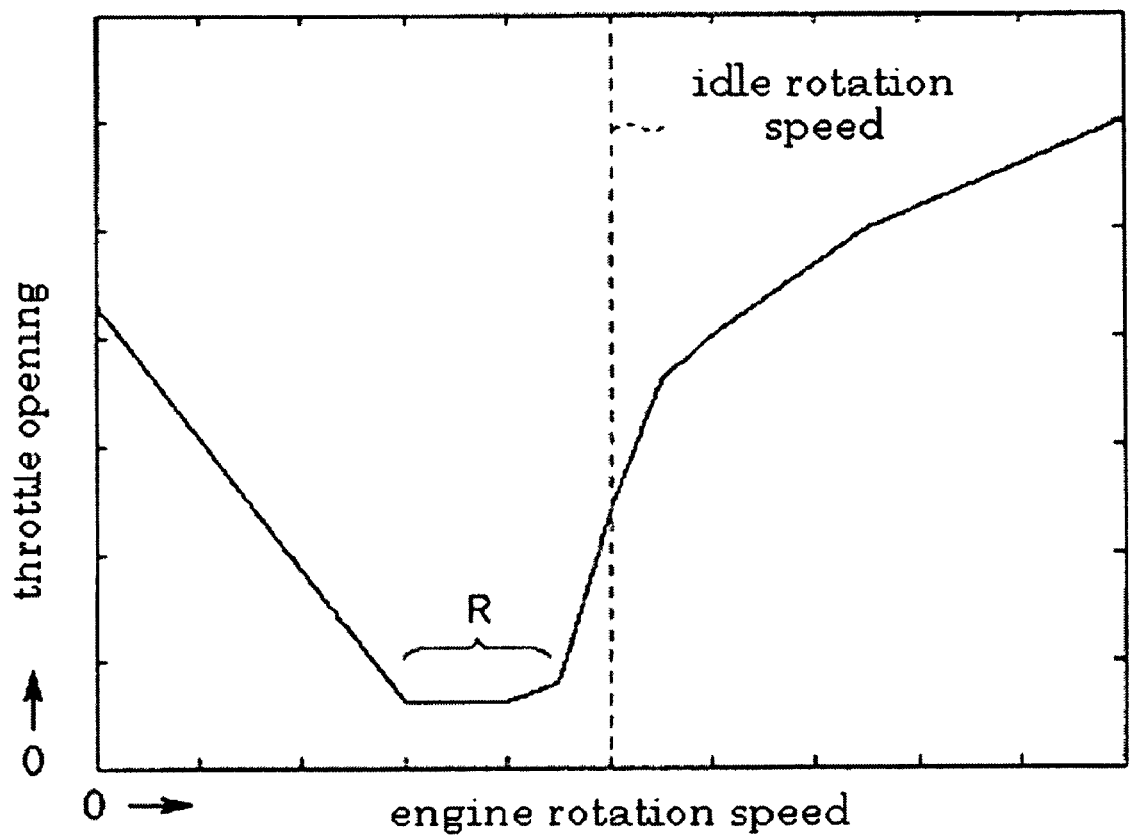
FIG. 6D is a graph showing the relationship between engine rotation speed and throttle opening corresponding to a fourth accelerator opening of the control map of FIG. 4B.

Moreover, as shown in FIGS. 5B to 5D, the throttle opening is set to be constant, irrespective of the accelerator opening, over a wide range except for a portion where the accelerator opening is near zero in the above-mentioned region R. With this setting, while the occurrence of the reverse rotation of the engine 6 is prevented, a throttle opening capable of supplying the quantity of fuel necessary for forward rotation of the engine 6 can be easily kept over the above-mentioned wide region R. That is, whether or not reverse rotation of the engine 6 occurs depends on the relationship between the engine rotation speed and the throttle opening, as will be described later, so that it is preferable that an appropriate throttle opening is held constant irrespective of the accelerator opening.

Further, as shown in FIGS. 6A to 6D, the throttle opening in the region R is set to be lower than the throttle opening corresponding to when the engine rotation speed is 0. For this reason, a graphical representation of the throttle opening/engine rotation speed relationship exhibits a valley shape in which the bottom portion of the valley is formed in the above-mentioned region R, located at the higher side of the engine rotation speed in the portion of the control map in which the engine rotation speed ranges from zero to the idle rotation speed. Here, the reason why the throttle opening changes linearly relative to the accelerator opening (see FIG. 5A) when the engine rotation speed is 0 (See FIG. 5E) is that when the accelerator grip 5 is operated in a state where the engine 6 is stopped, a rider can visually check that the throttle valve is operated according to the operation of the accelerator 5.

In this regard, the control map described above is a control map applied to a case where the transmission of the engine 6 is determined to be in neutral, but in addition to this, the same control map may be applied also to a case where the transmission of the engine 6 is in another state (e.g., a state of any transmission ratio).

Figure 7:
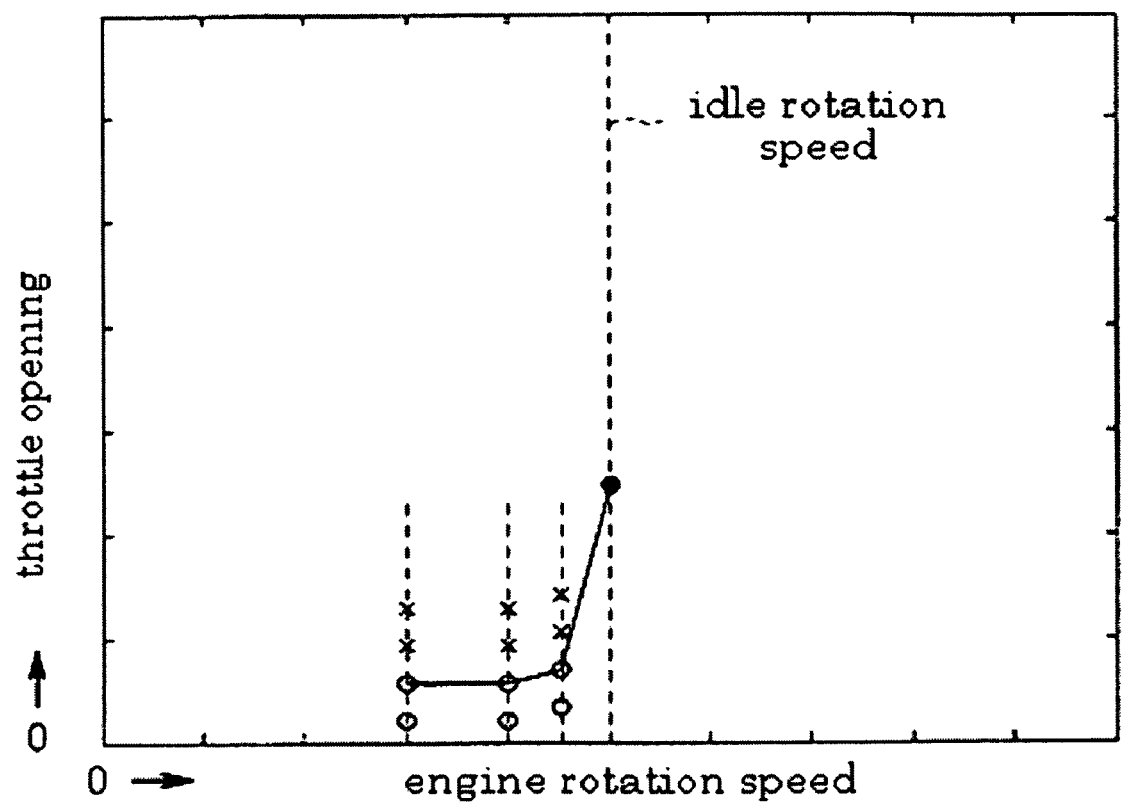
FIG. 7 is a graph illustrating a method for producing a control map.

FIG. 7 is a diagram showing a method for producing a control map. Here, a method for producing a control map in a range where the engine rotation speed is lower than the idle rotation speed will be described. A map is produced in this range by experimentally determining the conditions under which reverse rotation of the engine 6 occurs, and then using the experimental results to construct the map.

Specifically, first, the electronically controlled throttle 61 is controlled to adjust the throttle opening in such a way that the engine rotation speed becomes lower than the idle rotation speed. Here, the idle rotation speed has been previously determined as a relatively large engine rotation speed which is sufficient to prevent the occurrence of reverse rotation of the engine 6. A throttle opening for keeping the idle rotation speed is also determined in advance.

Then, the electronically controlled throttle 61 is controlled to increase the throttle opening in a state where the engine rotation speed is lower than the idle rotation speed. At this time, when a larger quantity of air-fuel mixture than can be compressed flows into the combustion chamber of the engine 6, reverse rotation of the engine 6 occurs. Thus, it is determined whether or not the reverse rotation of the engine 6 occurs, and the engine rotation speed and the throttle opening (throttle opening after increase) are recorded in correspondence with each other. Here, whether or not reverse rotation of the engine 6 occurs can be determined, for example, on the basis of detection signals from the crank pulse sensor 16.

The above-mentioned process is repeated a number of times while the engine rotation speed and the throttle opening are varied respectively. Thus, as shown in FIG. 7, the conditions under which reverse rotation of the engine 6 occurs or does not occur can be determined from the observed relationship between the engine rotation speed and the throttle opening.

Then, from the results acquired in this process, the relationship between the engine rotation speed and the throttle opening in which the reverse rotation of the engine does not occur is set in the control map. Thus, the throttle opening that can prevent the occurrence of the reverse rotation of the engine 6 in a range in which the engine rotation speed is lower than the idle rotation speed is set in the control map.

Here, it is preferable to set a larger throttle opening in the control map among the throttle openings to prevent the occurrence of the reverse rotation of the engine 6. It is, therefore, possible to supply a quantity of fuel which is sufficient for the forward rotation of the engine 6. Moreover, as described above, when the throttle opening read from the control map is corrected according to the detected water temperature and the atmospheric pressure, it is preferable to set the throttle opening in consideration of a maximum variation by the correction.

Moreover, the relationship between the engine rotation speed and the throttle opening, set in this manner, is set over nearly the entire range of the accelerator opening. The range of the control map in which the engine rotation speed is lower than the idle rotation speed is produced in the manner described above.

It is to be clearly understood that the above description was made only for purposes of example and not as a limitation on the scope of the invention as claimed herein below.

What is claimed:

1. An engine control unit for a vehicle having an engine with an electronically controlled throttle valve and an accelerator operated by a rider, the engine control unit comprising:
a first module configured to acquire the degree of opening of the accelerator;
a second module configured to acquire the rotation speed of the engine;
a third module configured to control the opening of the throttle valve of the engine on the basis of the acquired accelerator opening and engine rotation speed; and
a control map relating throttle opening, accelerator opening and engine rotation speed in a pre-determined manner, the third module determining the throttle valve opening based on the acquired accelerator opening and engine rotation speed with reference to the control map, wherein the third module limits the opening of the throttle valve when the engine rotation speed is lower than a pre-determined idle rotation speed of the engine to prevent reverse rotation of the engine.

2. The engine control unit of claim 1, wherein the third module is configured to correct the throttle opening determined from the control map based on input from a plurality of engine sensors and determine a corresponding final throttle opening.

3. The engine control unit of claim 2, wherein the plurality of engine sensors includes a water temperature sensor and an atmospheric pressure sensor.

4. The engine control unit of claim 1, wherein the control map is a three-dimensional map.

5. The engine control unit of claim 1, wherein the control map is produced on the basis of whether or not reverse rotation of the engine occurs when the opening of the throttle valve is increased in a state in which the rotation speed of the engine is lower than the idle rotation speed.

6. The engine control unit of claim 1, wherein the throttle opening control module sets the opening of the throttle valve to a substantially constant value, irrespective of the opening of the accelerator, over at least a portion of a range in which the rotation speed of the engine is lower than the pre-determined idle rotation speed and the opening of the accelerator is greater than or equal to a specified opening.

7. The engine control unit of claim 6, wherein the throttle opening control module limits the opening of the throttle valve so that it is less than the opening of the throttle valve when the rotation speed of the engine is zero in at least a portion of a range in which the rotation speed of the engine is lower than the pre-determined idle rotation speed.

8. A throttle opening control system for a vehicle engine having an accelerator adapted to be operated by an operator, the throttle opening control system comprising:
an electronically controlled throttle;
a plurality of engine sensors; and
an engine control unit configured to control the operation of the electronically controlled throttle on the basis of input signals from the plurality of engine sensors, the engine control unit comprising:
a first module configured to acquire the degree of opening of the accelerator;
a second module configured to acquire the rotation speed of the vehicle engine;
a third module for controlling the opening of the electronically controlled throttle on the basis of the acquired accelerator opening and engine rotation speed; and
a control map relating throttle opening, accelerator opening and engine rotation speed in a pre-determined manner, the third module configured to determine a throttle opening corresponding to the acquired accelerator opening and engine rotation speed with reference to the control map, wherein the third module limits the opening of the electronically controlled throttle when the engine rotation speed is lower than a pre-determined idle rotation speed of the engine to prevent reverse rotation of the engine.

9. A throttle opening control device for a vehicle having an engine with an electronically controlled throttle valve and an accelerator operated by a rider, the throttle control device comprising:
an accelerator opening acquisition module for acquiring an opening of the accelerator based on an input from an accelerator opening sensor;
an engine rotation speed acquisition module for acquiring a rotation speed of the engine based on an input from an engine speed sensor; and
a throttle opening control module for controlling an opening of the throttle valve based on the opening of the accelerator and the rotation speed of the engine, wherein the throttle opening control module is configured to limit the opening of the throttle valve when the rotation speed of the engine is lower than a pre-determined idle rotation speed.

10. The throttle opening control device as claimed in claim 9, further comprising
memory for holding a control map that relates the opening of the throttle valve to the opening of the accelerator and the rotation speed of the engine and in which the opening of the throttle is limited for rotational speeds of the engine less than the pre-determined idle rotation speed, wherein the throttle opening control module controls the opening of the throttle valve based on the control map.

11. The throttle opening control device as claimed in claim 10, wherein in the control map limits the opening of the throttle valve so as to prevent occurrence of reverse rotation of the engine.

12. A motorcycle provided with the throttle opening control device as claimed in claim 11.

13. The throttle opening control device as claimed in claim 10, wherein the control map is produced based on tests performed to determine whether or not reverse rotation of the engine occurs when the opening of the throttle valve is increased in a state where the rotation speed of the engine is lower than the idle rotation speed.

14. A motorcycle provided with the throttle opening control device as claimed in claim 13.

15. A motorcycle provided with the throttle opening control device as claimed in claim 10.

16. The throttle opening control device as claimed in claim 9, wherein the throttle opening control module controls the opening of the throttle valve so as to prevent occurrence of reverse rotation of the engine.

17. A motorcycle provided with the throttle opening control device as claimed in claim 16.

18. The throttle opening control device as claimed in claim 9, wherein the throttle opening control module sets the opening of the throttle valve to a constant, irrespective of the opening of the accelerator, over at least a portion of a range in which the rotation speed of the engine is lower than the pre-determined idle rotation speed and the opening of the accelerator is greater than or equal to a specified opening.

19. A motorcycle provided with the throttle opening control device as claimed in claim 18.

20. The throttle opening control device as claimed in claim 9, wherein the throttle opening control module limits the opening of the throttle valve so that it is less than the opening of the throttle valve when the rotation speed of the engine is zero in at least a portion of a range in which the rotation speed of the engine is lower than the pre-determined idle rotation speed.

21. A motorcycle provided with the throttle opening control device as claimed in claim 20.

22. A motorcycle provided with the throttle opening control device as claimed in claim 9.

23. A method for producing a control map for a throttle control device for a vehicle engine having an accelerator adapted to be operated by an operator and an electronically controlled throttle under control of the throttle control device, the method comprising the steps of:
adjusting a throttle opening of the engine such that the engine rotation speed becomes lower than a pre-determined idle rotation speed of the engine;
increasing the throttle opening in a state defined by the engine rotation speed being lower than the idle rotation speed;
determining whether reverse rotation of the engine occurs in the defined state;
recording the corresponding engine rotation speed and increased throttle opening values in the defined state; and
utilizing recorded engine rotation speed and throttle opening values for which reverse rotation of the engine does not occur to set up the control map.

* * * * *